(12) United States Patent
Wang et al.

(10) Patent No.: US 12,047,991 B2
(45) Date of Patent: Jul. 23, 2024

(54) UE SIGNAL TO INTERFERENCE POWER RATIO DETECTION FOR NETWORK SCHEDULING ASSISTANCE

(71) Applicant: Apple Inc., Cupertino, CA (US)

(72) Inventors: Fucheng Wang, Cupertino, CA (US); Anatoliy Sergey Ioffe, Redwood City, CA (US); Camila Priale Olivares, Munich (DE); Daniel Popp, Munich (DE); Alexander Sayenko, Munich (DE); Elmar Wagner, Taufkirchen (DE)

(73) Assignee: Apple Inc., Cupertino, CA (US)

( * ) Notice: Subject to any disclaimer, the term of this patent is extended or adjusted under 35 U.S.C. 154(b) by 172 days.

(21) Appl. No.: 17/504,237

(22) Filed: Oct. 18, 2021

(65) Prior Publication Data

US 2023/0096224 A1 Mar. 30, 2023

Related U.S. Application Data

(60) Provisional application No. 63/248,046, filed on Sep. 24, 2021.

(51) Int. Cl.
*H04W 76/30* (2018.01)
*H04W 72/542* (2023.01)

(52) U.S. Cl.
CPC ......... *H04W 72/542* (2023.01); *H04W 76/30* (2018.02)

(58) Field of Classification Search
CPC ... H04W 72/542; H04W 76/30; H04B 17/336
See application file for complete search history.

(56) References Cited

U.S. PATENT DOCUMENTS

2004/0001554 A1 1/2004 Sun et al.
2011/0103326 A1* 5/2011 Kim ..................... H04L 1/1822
370/329

(Continued)

FOREIGN PATENT DOCUMENTS

EP 1553707 A1 7/2005

OTHER PUBLICATIONS

R4-141741 "WF on RF component parameters for 2UL inter-band CA MSD development", MediaTek Inc., 3GPP TSG-RAN WG4 Meeting #70bis, San Jose Del Cabo, Mexico, Mar. 31-Apr. 4, 2014.

(Continued)

*Primary Examiner* — Anez C Ebrahim
(74) *Attorney, Agent, or Firm* — Fletcher Yoder, P.C.

(57) ABSTRACT

Embodiments disclosed herein relate to techniques for measuring and/or detecting a signal-to-interference ratio (SIR) of a received signal at a user equipment (UE). The received signal may include a desired signal, co-channel interference, adjacent channel interference, and an in-band blocker. The UE may filter (e.g., remove) the various interferences and in-band blocker. The UE may determine or measure a power (or Received Signal Strength Indicator (RSSI)) of the desired signal and a power (or RSSI) of the co-channel interference separately because the desired signal and the co-channel interference overlap in frequency. To do so, the UE may determine a total power of the received signal including the desired signal and co-channel interference. The UE may receive the desired signal again while an uplink transmission is deactivated (and thus without the interference). The UE may then calculate the SIR based on the total power and the power of the desired signal.

20 Claims, 7 Drawing Sheets

(56) References Cited

U.S. PATENT DOCUMENTS

| | | | |
|---|---|---|---|
| 2013/0044621 A1 | 2/2013 | Jung et al. | |
| 2018/0132190 A1* | 5/2018 | Jeon | H04W 72/12 |
| 2019/0082337 A1 | 3/2019 | Gheorghiu et al. | |
| 2020/0358500 A1 | 11/2020 | Ryu et al. | |
| 2021/0345141 A1* | 11/2021 | Cao | H04W 24/10 |
| 2022/0095235 A1* | 3/2022 | Zhang | H04W 52/028 |

OTHER PUBLICATIONS

R4-141740 "UE self-desensitization level versus Tx power back-off", MediaTek Inc., 3GPP TSG-RAN WG4 Meeting #70bis, San Jose Del Cabo, Mexico, Mar. 31-Apr. 4, 2014.
3GPP Technical Report (TR) 37.716-11-11 V16.0.0 (Jun. 2020).
R4-2114700 "Views on defining low MSD for CA and DC", Apple, 3GPP RAN WG4 Meeting Aug. 16-27, 2021.
Partial European Search Report for European Patent Application No. 22173283.7 dated Oct. 25, 2022; 11 pgs.
Extended European Search Report for European Patent Application No. 23200684.1 dated Dec. 22, 2023; 10 pgs.

* cited by examiner

UE SIGNAL TO INTERFERENCE POWER RATIO DETECTION FOR NETWORK SCHEDULING ASSISTANCE

CROSS-REFERENCE TO RELATED APPLICATIONS

This application claims priority to and benefit of U.S. Provisional Application No. 63/248,046, filed Sep. 24, 2021, and entitled "UE SIGNAL TO INTERFERENCE POWER RATIO DETECTION FOR NETWORK SCHEDULING ASSISTANCE," which is incorporated herein by reference in its entirety for all purposes.

BACKGROUND

The present disclosure relates generally to wireless communication, and more specifically to improving wireless communication with a network.

A wireless communication network, such as a cellular network, may determine whether and/or how to schedule uplink and/or downlink communication with user equipment based on an estimated interference that may exist when the user equipment operates on a certain frequency band combination. However, this estimated interference (e.g., a maximum sensitivity degradation (MSD) value) may be a "worst case scenario," such that, in at least some cases, the estimated interference may not actually exist. As such, the network may de-prioritize the user equipment, schedule the user equipment with lesser operating characteristics, or even not schedule the user equipment altogether, even though the user equipment may not actually exhibit the estimated interference.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method is presented that includes deactivating, by processing circuitry of user equipment, uplink transmissions. The method also includes receiving, at an antenna of the user equipment, a signal. The method also includes activating, by the processing circuitry, the uplink transmissions. The method also includes receiving, at the antenna, interference. The method also includes determining, by the processing circuitry, a signal-to-interference ratio based on the signal and the interference.

In another embodiment, one or more tangible, non-transitory, computer-readable media is presented. The media stores instructions that cause one or more processors perform operations including receiving a signal having known symbols. The operations also include determining a power of a portion of the signal corresponding to the known symbols. The operations also include determining an interference power of the signal corresponding to interference in the signal. The operations also include determining a signal-to-interference ratio based on the power of the portion of the signal corresponding to the known symbols and the interference power.

In yet another embodiment, a communication system is presented. The communication system includes a base station configured to configure a frequency band combination for user equipment. The base station is also configured to cause the user equipment to determine a signal-to-interference ratio for the frequency band combination. The base station is also configured to schedule operation of the user equipment based on the signal-to-interference ratio. The user equipment is configured to determine the signal-to-interference ratio for the frequency band combination and send an indication of the signal-to-interference ratio to the base station.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

Figure 1:
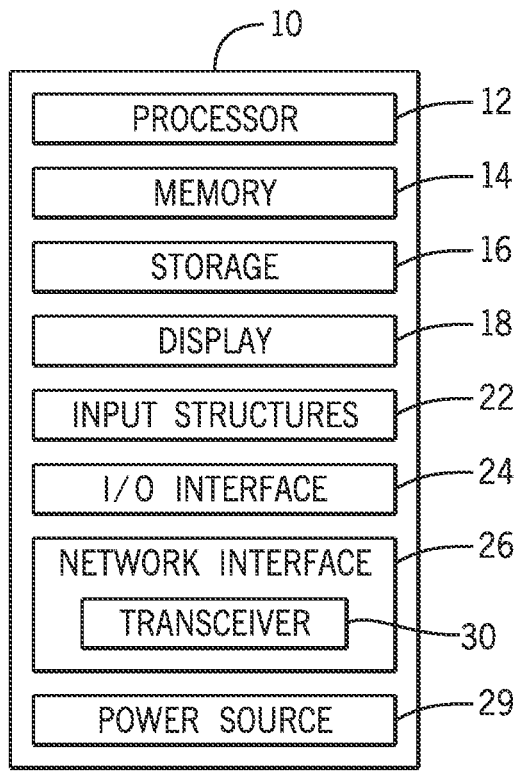
FIG. 1 is a block diagram of user equipment (e.g., an electronic device), according to embodiments of the present disclosure.

FIG. 1 is a block diagram of user equipment 10 (e.g., an electronic device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including user equipment, a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The power source 29 of the user equipment 10 may include any suitable source of power, such as a rechargeable lithium polymer (Li-poly) battery and/or an alternating current (AC) power converter.

Figure 2:
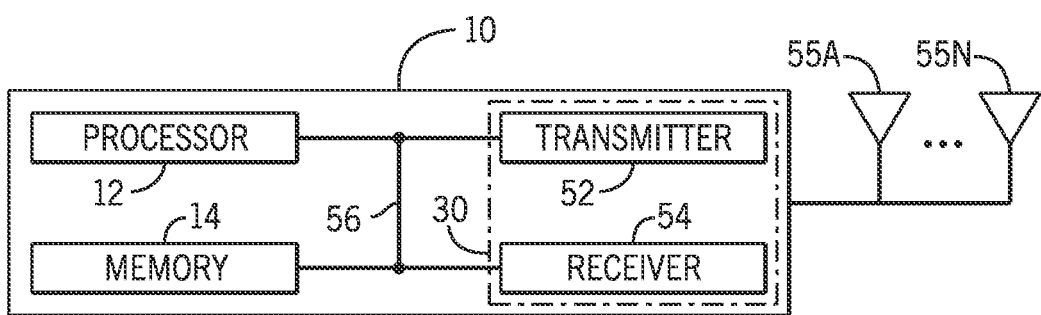
FIG. 2 is a functional block diagram of the user equipment of FIG. 1, according to embodiments of the present disclosure.

FIG. 2 is a functional block diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N (e.g., of an antenna group or module) may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

With this in mind, in wireless communication, a signal-to-noise ratio (or SNR) is a parameter that facilitates determining how well a wireless signal (e.g., received at the receiver 54) may be demodulated and how much data may be packed into a fixed channel bandwidth for a digitally modulated signal. Additionally, noise that affects signal quality with respect to demodulation may also include interference, so the parameter may include this interference and then be defined as signal-to-interference-and-noise ratio (or SINR). SINR is conceptually illustrated in FIG. 3 discussed below.

Figure 3:
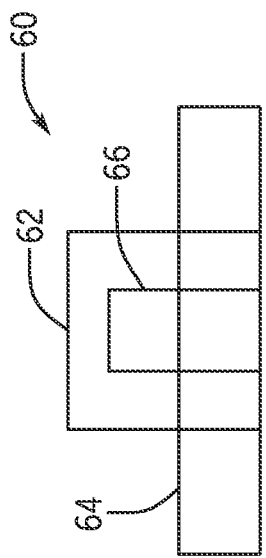
FIG. 3 illustrates a wireless signal received by the user equipment of FIG. 1 including a target signal, noise, and interference.

FIG. 3 illustrates a wireless signal 60 received by the user equipment 10 including a target signal 62, noise 64, and interference 66, in the frequency domain. In some cases, the interference 66 may at least partially overlap with (e.g., fall within; fall on top of) the signal 62 (e.g., the desired or data signal), and as such may be referred to as co-channel interference. The interference 66 may be generated by external sources (e.g., external to the user equipment 10) or may be self-generated within the transceiver 30 (e.g., by one or more uplink aggressors via various mechanisms in a frequency band combination, such as uplink (e.g., UL) harmonics, inter-modulation between two uplink signals (e.g., 2UL inter-modulation), cross-band interference due to uplink and downlink band proximity, harmonic mixing, and so on).

"Uplink aggressor" may refer to wireless transmission by a transmitter 52 of the user equipment 10, which may interfere (e.g., modulate) with wireless reception by the receiver 54 of the user equipment 10. While the disclosure may refer to self-interference generated by an uplink aggressor, it should be understood that, at least in some cases, the self-interference may be generated by a downlink aggressor (e.g., a wireless reception by one or more receivers 54 of the user equipment 10) that may interfere (e.g., modulate) with wireless reception by the receiver 54 of the user equipment 10. In 3GPP, the impact of the self-interference to a reference sensitivity (or REFSENS) degradation is defined as the maximum sensitivity degradation (or MSD) in decibels (dB). The MSD may be a difference between the reference sensitivity and the interference. That is, the MSD may indicate an increase in transmission power to apply to the downlink signal in order for it to be demodulated (e.g., when there is interference affecting the downlink signal). The delta or difference between the regular reference and the interference is the MSD. REFSENS may be defined as a minimum received signal power level which may be demodulated by the receiver 54 to achieve a certain percentage of data throughput under a particular digital signal modulation scheme, such as quadrature phase shift keying (QPSK).

Depending on the carrier configurations and interference mechanism, the MSD value may range from low single digit dB (e.g., 2 dB) to 30+ dB based on the radio frequency (RF) front-end components' linearity and isolation performance. For certain frequency band combinations with an MSD above 20 dB, network operators may be concerned that such a high sensitivity degradation may not be sufficiently useful and thus restrict usage of those combinations in certain carrier configurations. For example, network operators may store (e.g., in a data structure, such as a table) frequency band combinations and associated MSD values as a reference for carrier configuration scheduling decisions. If a frequency band combination is associated with an MSD above 20 dB, the network operators may become less interested in configuring those frequency band combinations for the user equipment 10. That is, network operators may not schedule any uplink and/or downlink communication for that user equipment 10.

However, the MSD values associated with various frequency band configurations may be defined as a minimum requirement under a particular worst-case test configuration. That is, the MSD values were not intended to be used for network scheduling, nor as a criterion for whether the frequency band combination may be configured or used for the user equipment 10. In particular, and indeed in most cases, the user equipment 10 may perform better than the MSD values specified for a particular frequency band combination (e.g., the MSD value specified may represent a high tail value of the statistical distribution of UE MSD performance), even for a same test configuration. Moreover, when interference is misaligned (e.g., the interfering frequency is not aligned with a frequency of the target signal 62) with a victim carrier (e.g., a victim downlink (DL) carrier), the MSD value may be reduced substantially. Also when uplink aggressor power (e.g., transmission power of the transmitter 52) is reduced, the MSD caused by second order or higher interference may decrease faster than uplink power reduction.

As MSD for a frequency band combination may vary substantially, if there is no SNR, SINR, or signal-to-interference ratio (SIR) detection mechanism on the user equipment 10 side, then the communication network may simply assume (e.g., erroneously) that the user equipment 10 is subject to the MSD (e.g., a worst case MSD) as defined in a specification (e.g., a 3GPP technical specification), and scheduling of the frequency band combination may become inefficient. In fact, in a worst case scenario, these frequency band combinations may never be scheduled for any user equipment 10 in any circumstance, even though their actual MSD performance may be much better than that defined (e.g., specified) by the specification (under many operation scenarios).

The signal-to-noise ratio (SNR) of the wireless signal 60 may refer to a measure of a power level of the target signal 62 with reference to a power level of background noise. The signal-to-interference ratio (SIR) may refer to a measure of an average power of a received modulated signal 62 to a measure of an average power of the interference 66. The signal-to-noise-and-interference ratio (SNIR) (e.g., signal-to-noise-plus-interference ratio) or SINR may refer to a measure of the power level of the target signal 62 with reference to a power level of the interference and noise (e.g., a power of the interference plus a power of the noise). The disclosed embodiments enable the user equipment 10 to determine, detect, and/or measure SIR for a frequency band combination (under many or all operating conditions). The user equipment 10 may report (e.g., transmit) the SIR to the communication network to assist in scheduling the frequency band combination.

Figure 4:
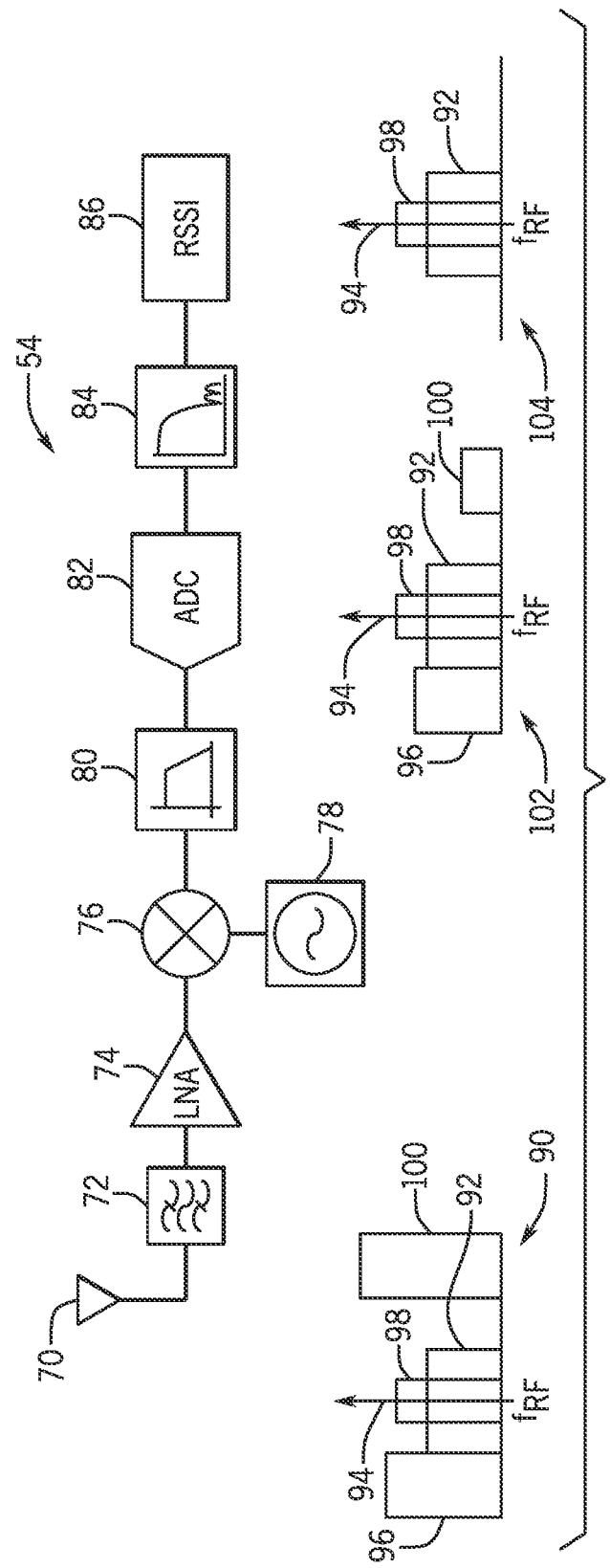
FIG. 4 is a schematic diagram of a receiver of the user equipment of FIG. 1, according to embodiments of the present disclosure.

FIG. 4 is a schematic diagram of a receiver 54 of the user equipment (UE) 10 of FIG. 1, according to embodiments of the present disclosure. As illustrated, the receiver 54 includes an antenna 70, a band-pass filter (BPF) 72, a low noise amplifier (LNA) 74, a mixer 76, a low pass filter (LPF) 80, an analog-to-digital converter (ADC) 82, a digital channel selection filter 84, and a power detector 86. In some embodiments, the antenna 70 of the receiver may be representative of the antennas 55 of the user equipment 10 of FIG. 2. In some embodiments, the antenna 70 may be a separate and additional antenna of the user equipment 10.

The antenna 70 of the receiver 54 may receive a received signal 90, which may include a desired or wanted signal 92 (which may have a center radio frequency 94 of $f_{RF}$), along with undesired interference or noise, such as adjacent channel interference 96, co-channel interference 98, and an in-band blocker 100. In some cases, the received signal 90 may also include an out-of-band blocker (not shown). The received signal 90 is passed through various components of the receiver 54 to remove (or reduce) the out-of-band blocker, the in-band blocker 100, and/or adjacent channel interference 96.

For example, the received signal 90 is passed through the band-pass filter 72 (BPF) which may filter undesired frequencies or frequency bands from the received signal 90, and then through the LNA 74 which may amplify the band-pass filtered signal. The amplified signal may be mixed, using the mixer 76, with a local oscillation signal provided by a local oscillator 78 (LO), and then be passed through the LPF 80. The signal output by the LPF 80 (e.g., a post-LPF signal 102) may include decreased amplitudes with respect to the adjacent channel interference 96 and/or the in-band blocker 100, as illustrated, so that the ADC 82 may have sufficient dynamic range to convert the post-LPF signal 102. The ADC 82 may then convert the signal to a digital format, and the digital signal may then be input to the digital channel selection filter 84, which may be implemented as a finite impulse response (FIR) filter. The digital channel selection filter 84 may filter the remaining adjacent channel interference 96 and/or in-band blocker 100 from the post-LPF signal 102, resulting in an output signal with the desired signal 92 and the co-channel interference 98 remaining.

The power detector 86 may determine or measure a power (or Received Signal Strength Indicator (RSSI)) of the signal output by the digital channel selection filter 84, including the desired signal 92 and the co-channel interference 98. That is, the power detector 86 may determine or measure a total power (or RSSI) of the desired signal 92 and the co-channel interference 98, combined (if both are present). To determine or measure a signal-to-interference ratio (SIR) of the received signal 90, the power detector 86 may determine or measure a power (or RSSI) of the desired signal 92 (e.g., at the antenna 55), and separately (e.g., independently) determine or measure a power (or RSSI) of the co-channel interference 98 (e.g., at the antenna 55), which may then enable the processor 12 of the user equipment 10 to determine the SIR of the received signal 90 based on the power of the desired signal 92 and the power of the co-channel interference 98. Advantageously, the power detector 86 can measure or determine the power (or RSSI) of the desired signal 92 separately from the power (or RSSI) of the co-channel interference 98. In this way, the user equipment 10 can compute the SIR of the received signal 90 and report the SIR to the communication network to facilitate scheduling of the frequency band combination.

Figure 5:
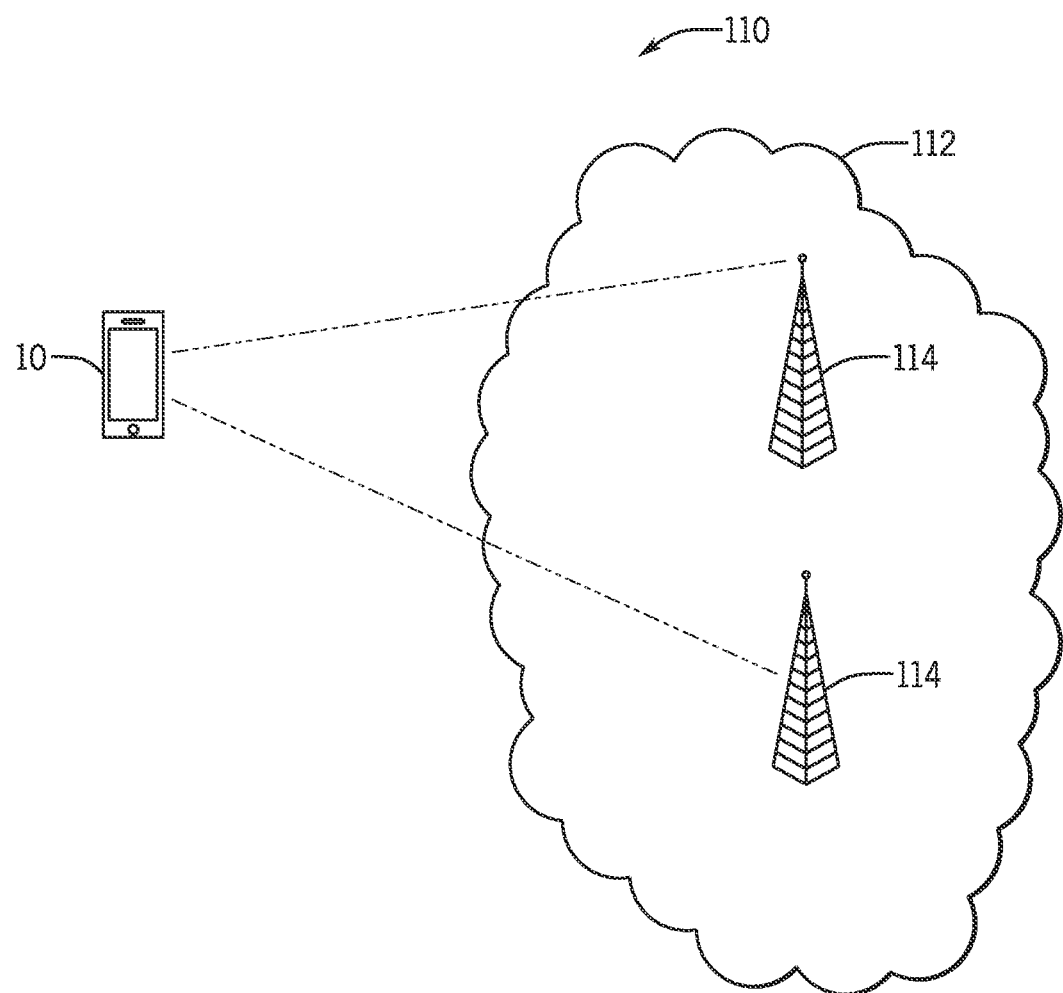
FIG. 5 is a schematic diagram of a communication network supported by one or more base stations and including the user equipment of FIG. 1, according to embodiments of the present disclosure.

FIG. 5 is a schematic diagram 110 of a wireless communication network 112 supported by one or more base stations 114 and including the user equipment 10 of FIG. 1, according to embodiments of the present disclosure. In particular, the one or more base stations 114 may include Evolved NodeB (eNodeB) base stations and may provide 4G/LTE coverage via the wireless communication network 112 to the user equipment 10. In some embodiments, the one or more base stations 114 may include Next Generation NodeB (gNodeB or gNB) base stations and may provide 5G/New Radio (NR) coverage via the wireless communication network 112 to the user equipment 10. Each of the user equipment 10 and the one or more base stations 114 may include at least some of the components of the electronic device 10 shown in FIGS. 1 and 2, including one or more processors 12, the memory 14, the storage 16, the transmitter 52, the receiver 54, and the associated circuitry shown in FIG. 4. It should be understood that while the present disclosure may use 4G/LTE as an example specification or standard, the embodiments disclosed herein may apply to other suitable specifications or standards (e.g., such as the 5G/NR specification).

Figure 6:
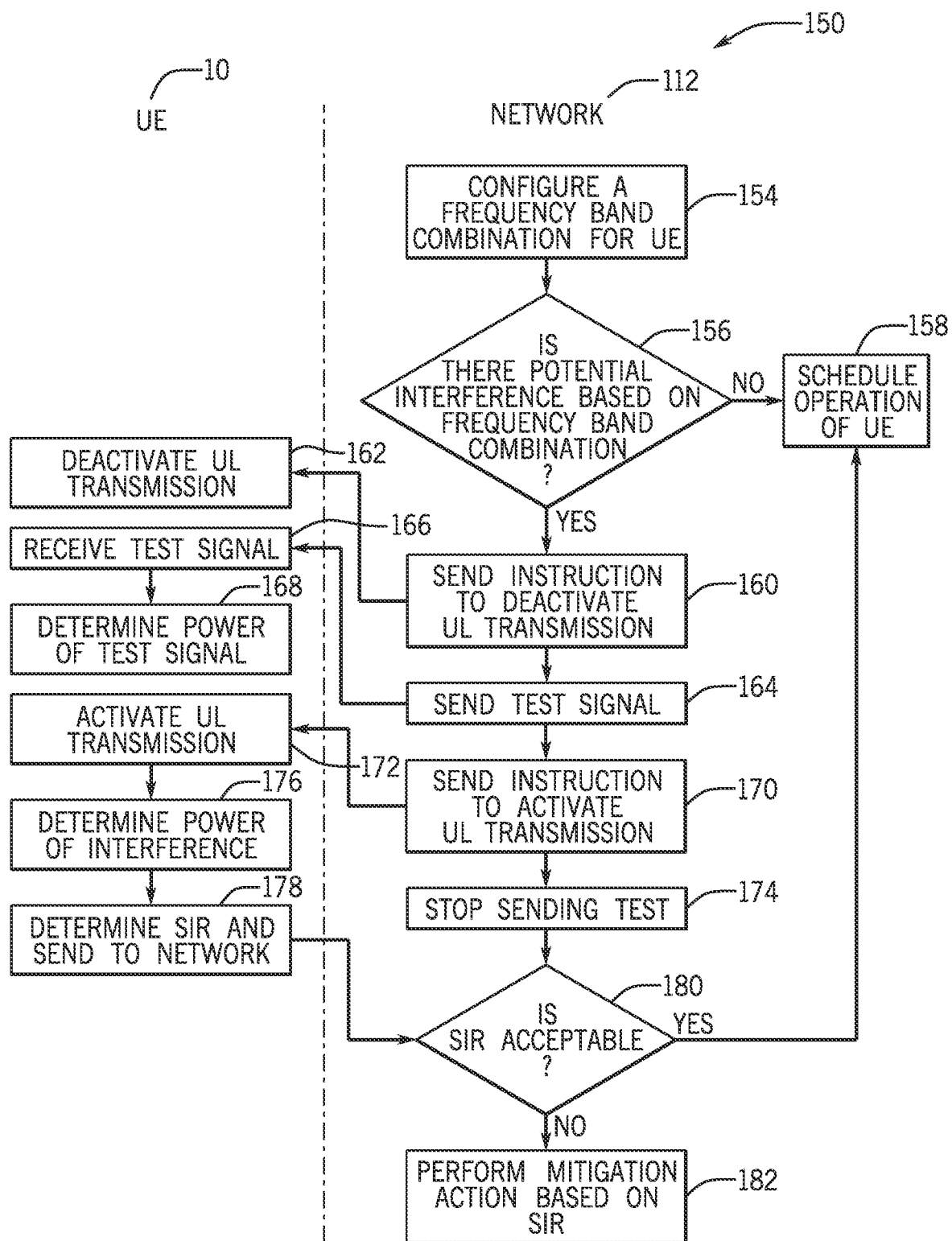
FIG. 6 is a flowchart of operations for separately determining the power of the desired signal and the co-channel interference, according to embodiments of the present disclosure.

FIG. 6 is a flowchart of operations 150 for separately determining the power of the desired signal and the co-channel interference. The user equipment (UE) 10 may request to establish communication on a network 112 (e.g., a cellular network, such as a 4G/LTE or 5G/NR network). The network 112 may be implemented as at least one communication hub or base station, such as the base stations 114 (e.g., an eNodeB or gNodeB) discussed with respect to FIG. 5. The operations 150 begin at operation 154, where the network 112 may configure a frequency band combination for the UE 10. The frequency band combination may include any suitable combination of frequency bands for uplink and/or downlink, as well as any suitable frequency bands (e.g., Evolved Universal Mobile Telecommunications System (UMTS) Terrestrial Radio Access (EUTRA)/NR bands 20, n8, and so on).

At operation 156, the network 112 may determine if there is potential interference (e.g., self-interference, such as intermodulation) that would occur between the frequency bands if the UE 10 were to operate (e.g., perform downlink or uplink operations) on the frequency bands. For example, for a 2-frequency band combination, the network 112 may determine whether there is potential interference based on the following equations and the table 200 shown in FIG. 7:

$$f_{INT} = a \times f_{TX1} + b \times f_{RX1} + c \times f_{TX2} + d \times f_{RX2} \quad \text{(Equation 1)}$$

$$BW_{INT} = |a| \times CBW_{TX1} + |c| \times CBW_{TX2} \quad \text{(Equation 2)}$$

$$|f_{INT}| < \frac{BW_{INT} + CBW_{RX1}}{2} \quad \text{(Equation 3)}$$

$$|f_{INT}| < \frac{BW_{INT} + CBW_{RX2}}{2} \quad \text{(Equation 4)}$$

where, assuming the interference is limited to up to 5th order mixing products:
"a" is an integer with a range between −5 and +5;
"b" is either −1, 0, or +1;
"c" is an integer with a range between −5 and +5;
"d" is either −1, 0, or +1;
$f_{INT}$ is the interference center frequency after receiver frequency down conversion;
$BW_{INT}$ is the effective bandwidth (BW) of the interference (INT);
$CBW_{TX1}$ is the uplink carrier channel BW for component carrier (CC) 1;
CBW is a channel bandwidth;
$CBW_{TX2}$ is the uplink carrier channel BW for CC2;
$CBW_{RX1}$ is the downlink carrier channel BW for CC1; and
$CBW_{RX2}$ is the downlink carrier channel BW for CC2.

The table 200 and the Equations (1)-(4) above may be used by the network 112 to determine an uplink carrier frequency and a downlink carrier frequency for a particular band configuration. Based on the uplink and/or downlink carrier frequencies, the network 112 may determine whether there is interference generated from the uplink side that would affect (e.g., fall onto) the downlink carrier. The network may determine some of the coefficients 204, 206 for the uplink and downlink, respectively, for each band combination prior to configuring the UE 10 for the band combination. The network 112 may use Equations (3) and (4) to determine when the co-channel interference is overlapping the downlink carrier channel for CC1 and CC2, respectively. For example, if Equation (3) is true, the interference overlaps (e.g., falls within) the downlink carrier channel BW for component carrier 1. Similarly, if Equation (4) is true, the interference overlaps the downlink carrier channel BW for component carrier 2.

As shown in the table 200, the network may also determine an interference type 212, such as intermodulation (IMD) interference or harmonic interference. The coefficients 204, 206 may be related to the type of interference type 212. The network may also determine a harmonic order 208 of the interference. Advantageously, the information in the table 200 may be determined by the network before configuring the UE 10 for a particular frequency band combination.

If the inequality of Equation 3 is met, then there is potential interference impacting downlink carrier 1. If the inequality of Equation 4 is met, then there is potential interference impacting downlink carrier 2. Turning back to FIG. 6, if there is no potential interference at operation 156, then the network 112 may schedule operation of the UE 10 on the combination of frequency bands at operation 158. If the network 112 determines there is potential interference impacting downlink carrier 1, downlink carrier 2, or both, then the network 112 determines the SIR for downlink carrier 1, downlink carrier 2, or both. In particular, the network 112 sends an instruction to the UE 10 to deactivate uplink transmissions at operation 160.

At operation 162, the UE 10 deactivates uplink transmissions. In some embodiments, the UE 10 may deactivate uplink transmissions that are cross-band with or may affect operation on the frequency band combination, while, in other embodiments, the UE 10 may deactivate all uplink transmissions. At operation 164, the network 112 then sends a test signal to the UE 10 (e.g., on downlink carrier 1, downlink carrier 2, or both). The test signal may mimic or copy a "real" signal or a signal that would typically be sent to the UE 10 from the network 112 using the frequency band combination. Because at least cross-band uplink transmissions are deactivated on the UE 10, at operation 166, the UE 10 may receive the test signal without interference (e.g., at least self-interference caused by uplink transmissions or aggressors or downlink receptions or aggressors).

At operation 168, the UE 10 then determines (e.g., using the power detector) a power or RSSI of the test signal (e.g., on downlink carrier 1, downlink carrier 2, or both). At operation 170, the network 112 then sends an instruction to the UE 10 to activate uplink transmissions (e.g., the uplink aggressors) that may cause the self-interference (e.g., self-generated), and the UE 10 activates uplink transmissions at operation 172. While the disclosure may refer to activating uplink transmissions, it should be understood that, at least in some cases, the instruction to the UE 10 may additionally or alternatively include activating downlink receptions (e.g., downlink aggressors) that may cause the self-interference.

At operation 174, the network 112 stops sending the test signal. Because the UE 10 is performing uplink transmissions, and no signals are received by the UE 10, the UE 10 on the frequency band combination, the UE 10 is effectively receiving the interference without the test signal at its antenna 55. At operation 176, the UE 10 then determines (e.g., using the power detector) a power or RSSI of the interference (e.g., on downlink carrier 1, downlink carrier 2, or both). At operation 178, the UE 10 (e.g., the processor 12 of the UE 10) determines the SIR based on the power of the test signal and the power of the interference (e.g., by dividing the power of the test signal by the power of the interference), and sends the SIR to the network 112. At operation 180, the network 112 may determine whether the SIR is acceptable. For example, the network 112 may compare the SIR to a threshold value. If the SIR is acceptable (e.g., greater than the threshold value), then the network 112 may schedule operation of the UE 10 on the combination of frequency bands at operation 158. If not, then the network 112 may perform one or more mitigation actions at operation 182.

In some cases, at least some of the interference (e.g., co-channel interference) may not be self-generated and may come from external interfering sources. As such, in some embodiments, this interference may be determined or measured during an idle mode (e.g., when the UE is not performing downlink or uplink operations) while the UE 10 is configured to the carrier frequencies for the frequency band combination, as instructed by the network 112.

Figure 8:
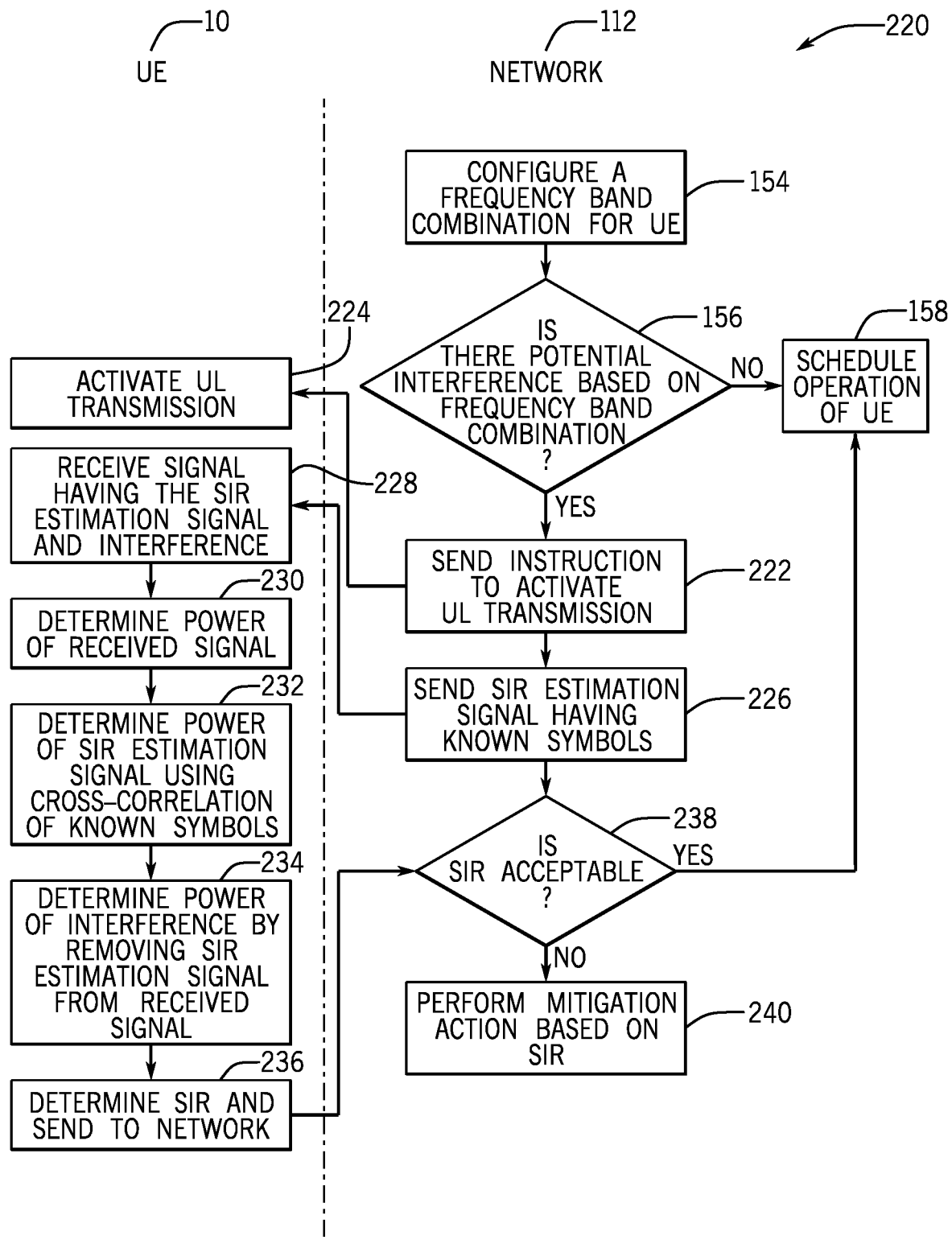
FIG. 8 is a flowchart of operations for estimating a signal-to-interference ratio (SIR) of the user equipment of FIG. 1, according to embodiments of the present disclosure.

In additional or alternative embodiments, when the network 112 determines, at operation 156, there is an interference impact to either downlink carrier 1, downlink carrier 2 or both, the network 112 may cause the UE 10 to determine the SIR for downlink carrier 1, downlink carrier 2, or both, as shown in the flowchart 220 of FIG. 8. In particular, the network 112 may send a SIR estimation signal to the UE 10 at operation 226. The SIR estimation signal may have symbols known (e.g., that are pre-determined and/or may be standardized) by the UE 10. Statistical properties of the SIR estimation signal may mimic a typical downlink signal. At operation 228, the UE 10 receives a received signal that includes the SIR estimation signal, as well as any interference that may be received at the antenna 55. The network 112 may cause the UE 10 to activate uplink transmissions (e.g., the uplink aggressors that may cause the self-interference) via sending an instruction to do so at operations 222 and 224. Additionally or alternatively, the network 112 may cause the UE 10 to activate downlink transmissions (e.g., the downlink aggressors that may cause the self-interference).

At operation 230, the UE 10 then determines the power (e.g., RSSI) of the received signal (e.g., using the power detector). In some embodiments, the power may be detected after executing channel equalization. At operation 232, the UE 10 (e.g., the processor 12 of the UE 10) determines the power of the SIR estimation signal by cross-correlating the received signal with the known symbols in the SIR estimation signal. In particular, the UE 10 may determine a measure of association and/or similarity between the received signal and the known symbols in the SIR estimation signal by performing the cross-correlation. In some cases, the cross-correlation may generate an additional signal that the UE 10 uses to determine the power of the SIR estimation signal.

At operation 234, the UE 10 (e.g., the processor 12 of the UE 10) determines the power of the interference by removing the SIR estimation signal from the received signal. At operation 236, the UE 10 (e.g., the processor 12 of the UE 10) determines the SIR based on the power of the test signal and the power of the interference (e.g., by dividing the power of the test signal by the power of the interference), and sends the SIR to the network 112. At operation 238, the network 112 may then determine whether the SIR is acceptable.

In any of the disclosed embodiments, the network 112 may periodically check on SIR performance. Advantageously with the embodiment described in FIG. 8, with the UE 10 being aware of the SIR estimation schedule, the network 112 may seamlessly transition between downlink data transmission and sending a SIR estimation downlink signal. That is, transitioning between uplink and downlink operations to determine SIR performance, as shown in FIG. 6, may be avoided. Moreover, during the SIR estimation procedure, the UE 10 may continue transmitting data and performing uplink procedures (e.g., to the network 112) as there is not a time where uplink transmissions is stopped (even temporarily). That is, the SIR estimation procedure of FIG. 8 does not interrupt UE 10 uplink transmission. In cases where the UE 10 may not have uplink procedures to perform, the UE 10 may transmit pseudo-random data, for example. Additionally, external noise and/or interference may be estimated by pausing uplink transmission during the estimation procedure. Any of the embodiments disclosed herein may be applied to a single frequency division duplex band to determine how much uplink transmission impact is present at various uplink configurations to a downlink carrier under a full-duplex operation.

Figure 7:
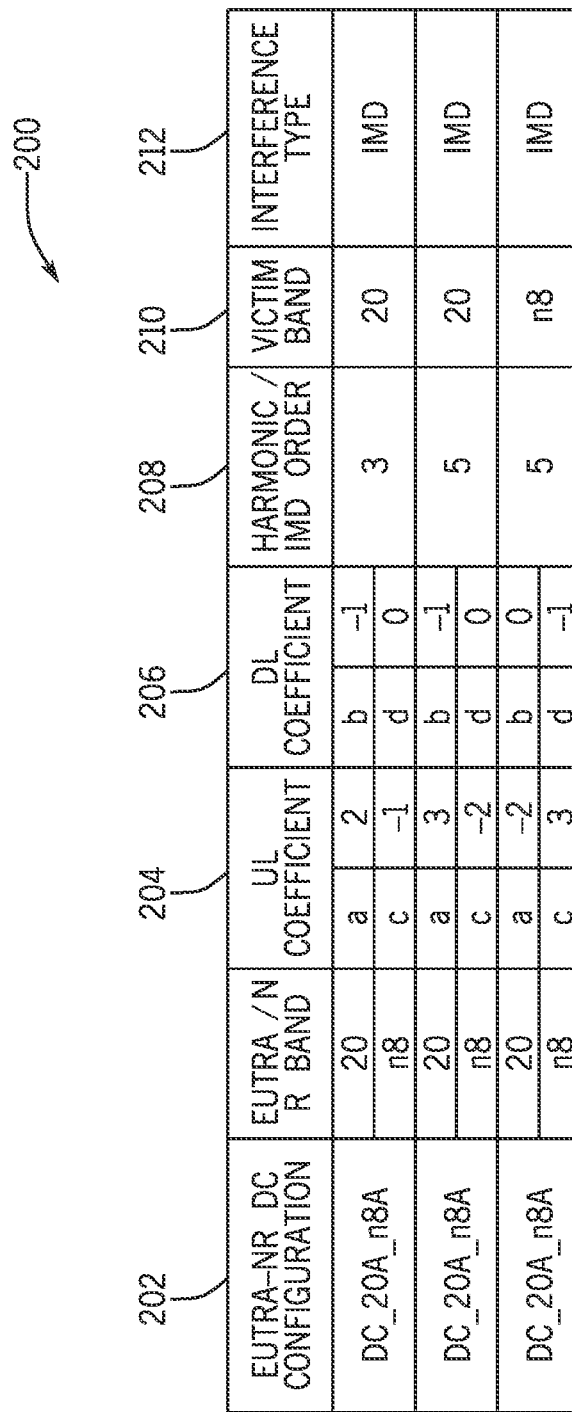
FIG. 7 is a table depicting example parameters for determining whether self-interference exists in the user equipment of FIG. 1, according to embodiments of the present disclosure.

As mentioned in both FIGS. 5 and 7, if the SIR is acceptable for downlink signal demodulation (e.g., greater than a threshold value), for example at operations 180, 218, the network 112 may schedule normal operation for the frequency band combination. Moreover, if the SIR meets a (higher) performance threshold, the network 112 may increase throughput or a modulation order of transmissions or receptions. For example, the network 112 may increase the modulation order from QPSK to a higher modulation order, such as 8 quadrature amplitude modulation (QAM), 16 QAM, 32 QAM, 64 QAM, 128 QAM, 256 QAM, and so on. In cases where the SIR is unacceptable for downlink signal demodulation (e.g., less than or equal to a threshold value), the network 112 may perform a mitigation action at operations 182, 240. The mitigation action may include downgrading transmission or reception of data, such as by only scheduling a master cell group in a dual-connectivity (DC) combination, only scheduling a primary cell (PCell) operation in a carrier aggregation (CA) combination, disabling secondary cell (SCell) uplink transmission in a 2-uplink (2UL) CA combination, disabling SCell downlink reception if it is impacted by either PCell uplink or both PCell and SCell uplink intermodulation product, or even not scheduling any operation for the UE 10.

Figure 9:
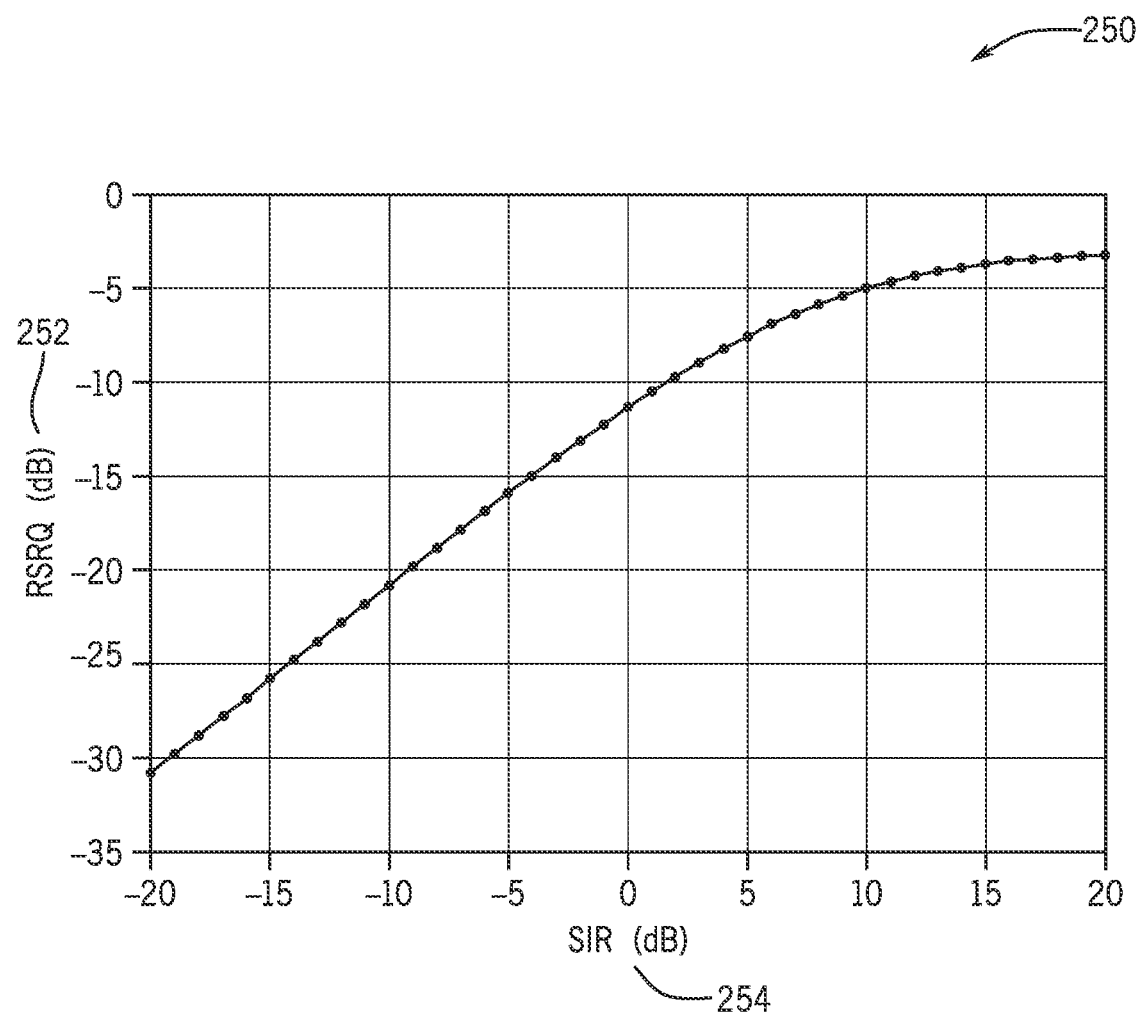
FIG. 9 depicts a plot illustrating a relationship between a Reference Signal Received Quality (RSRQ) and the signal-to-interference ratio (SIR) when interference power density is uniformly distributed over a carrier channel bandwidth, according to embodiments of the present disclosure.

In some embodiments, Reference Signal Received Power (RSRP) and/or Reference Signal Received Quality (RSRQ) values or measurement, as implemented or defined in the LTE and/or NR specifications, may be used as a signal quality indicator to assist network scheduling. That is, the SIR value or measurement, as discussed above, is a more direct or accurate indication of MSD caused by uplink interference as compared to RSRP and/or RSRQ. However, at least in some cases, the RSRP and/or the RSRQ may be used by the network 112 as an estimate or approximation of the SIR value. Indeed, FIG. 9 is a plot 250 illustrating a relationship between RSRQ 252 and SIR 254 when interference power density is uniformly distributed over a carrier channel bandwidth (e.g., most or all of the carrier channel bandwidth). Additionally, the RSRQ measurement may be combined with activating/deactivating uplink transmission to isolate interference from the external noise and/or interference. For example, either of the methods shown in FIG. 6 or 8 may be performed, where RSRP and/or RSRQ is substituted for the SIR value.

As an example, the network 112 may instruct the UE 10 to deactivate uplink transmissions, resulting in the UE 10 deactivating the uplink transmissions, and send a signal (e.g., a test signal) to be received at an antenna 55 of the UE 10. The UE 10 may determine an RSRP and/or an RSRQ (and/or an RSSI) of the signal. The network 112 may then instruct the UE 10 to activate the uplink transmissions, resulting in the UE 10 activating the uplink transmissions. The UE 10 may receive, at the antenna 55 of the UE 10, interference (e.g., self-interference caused by uplink and/or downlink aggressors of the UE 10), and determine an RSSI (and/or RSRP and/or RSRQ) of the interference. The UE 10 may then send the indication of the RSSI (and/or RSRP and/or RSRQ) of the interference to the network 112. The network 112 may then schedule operation of the UE 10 and/or perform mitigation procedures based on the RSSI (and/or RSRP and/or RSRQ) (e.g., based on a threshold comparison as previously described).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method, comprising:
deactivating, by processing circuitry of a user equipment, an uplink transmission capability based on a determination of potential interference associated with a frequency band combination;
receiving, at an antenna of the user equipment, a first signal while the uplink transmission capability is deactivated;
determining, by the processing circuitry, a first power of the first signal;
activating, by the processing circuitry, the uplink transmission capability;
receiving, at the antenna, a second signal comprising interference while the uplink transmission capability is activated;
determining, by the processing circuitry, a second power of the second signal while the uplink transmission capability is activated; and
determining, by the processing circuitry, a signal-to-interference ratio based on the first power and the second power.

2. The method of claim 1, wherein the interference is caused by an uplink transmission.

3. The method of claim 1, comprising, sending, via a transmitter of the user equipment, an indication of the signal-to-interference ratio to a network.

4. The method of claim 3, wherein the user equipment receives an allocation from the network, the allocation comprising a first frequency band and a second frequency band to the user equipment, the first signal being received on the first frequency band, an uplink transmission being sent on the second frequency band, and the interference received on the first frequency band being caused by the uplink transmission on the second frequency band.

5. The method of claim 1, comprising, determining, by the processing circuitry, a Reference Signal Received Power (RSRP) of the first signal and a Reference Signal Received Quality (RSRQ) of the first signal.

6. The method of claim 5, comprising:
determining, by the processing circuitry, a Received Signal Strength Indicator (RSSI) of the interference; and
sending, by a transmitter of the user equipment, an indication of the RSRP of the first signal, the RSRQ of the first signal, and the RSSI of the interference to a network.

7. The method of claim 5, wherein determining, by the processing circuitry, the signal-to-interference ratio is based on the RSRQ.

8. One or more tangible, non-transitory, computer-readable media, storing instructions that cause one or more processors to:
receive a signal having known symbols,
determine a power of a portion of the signal corresponding to the known symbols, the portion comprising a signal-to-interference estimation signal;
determine an interference power of the signal corresponding to interference in the signal by removing the portion of the signal comprising the signal-to-interference estimation signal from the signal; and
determine a signal-to-interference ratio based on the power of the portion of the signal corresponding to the known symbols and the interference power.

9. The one or more tangible, non-transitory, computer-readable media of claim 8, wherein the instructions cause one or more processors to determine the power of the portion of the signal corresponding to the known symbols by cross-correlating the signal with the known symbols.

10. The one or more tangible, non-transitory, computer-readable media of claim 8, wherein the interference in the signal is caused by uplink transmissions.

11. The one or more tangible, non-transitory, computer-readable media of claim 8, wherein the instructions cause one or more processors to send an indication of the signal-to-interference ratio to a network.

12. The one or more tangible, non-transitory, computer-readable media of claim 8, wherein the instructions cause the one or more processors to determine the known symbols before receiving the signal.

13. A communication system, comprising:
a base station configured to configure a frequency band combination for user equipment, cause the user equipment to determine a signal-to-interference ratio for the frequency band combination, and schedule operation of the user equipment based on the signal-to-interference ratio; and the user equipment configured to
deactivate uplink transmission capability of the user equipment,
receive a test signal based on the frequency band combination while the uplink transmission capability is deactivated,
determine a power of the test signal,
activate uplink transmissions,
determine interference associated with the frequency band combination while the uplink transmission capability is activated,
determine the signal-to-interference ratio for the frequency band combination based on the power of the test signal and the interference, and
send an indication of the signal-to-interference ratio to the base station.

14. The communication system of claim 13, wherein the base station is configured to cause the user equipment to determine the signal-to-interference ratio for the frequency band combination based on a potential interference associated the frequency band combination.

15. The communication system of claim 13, wherein the base station is configured to perform a mitigation action based on the indication of the signal-to-interference ratio.

16. The communication system of claim 15, wherein the mitigation action comprises downgrading transmission or reception of data.

17. The communication system of claim 15, wherein the mitigation action comprises disabling secondary cell uplink transmission capability in a 2-uplink carrier aggregation combination.

18. The communication system of claim 15, wherein the mitigation action comprises disabling secondary cell downlink reception capability.

19. The communication system of claim 13, wherein the user equipment is configured to determine a Reference Signal Received Power (RSRP) of the frequency band combination and a Reference Signal Received Quality (RSRQ) of the frequency band combination.

20. The communication system of claim 19, wherein the user equipment is configured to determine a Received Signal Strength Indicator (RSSI) of the interference, and send an indication of the RSRP of the test signal, the RSRQ of the test signal, and the RSSI of the interference to the base station.

* * * * *